Patented Aug. 25, 1925.

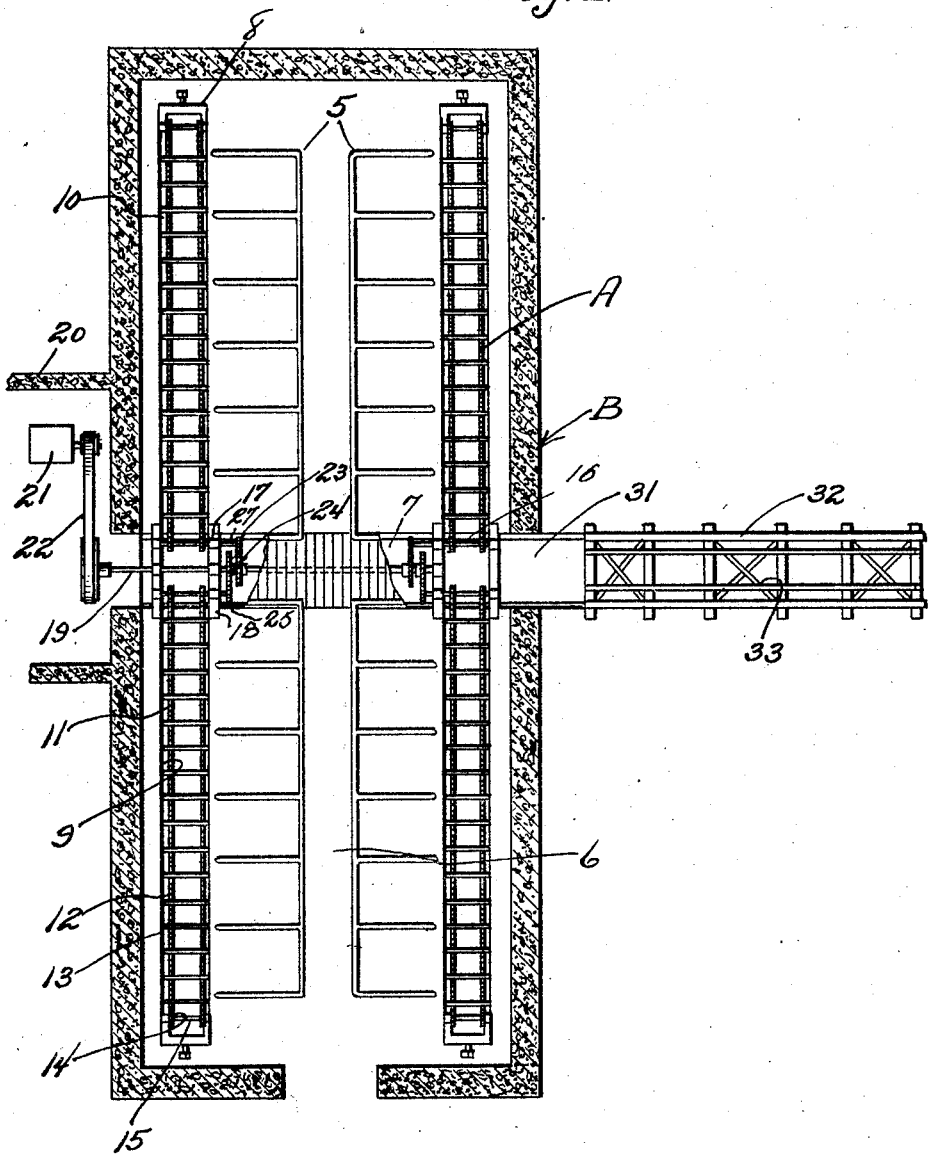

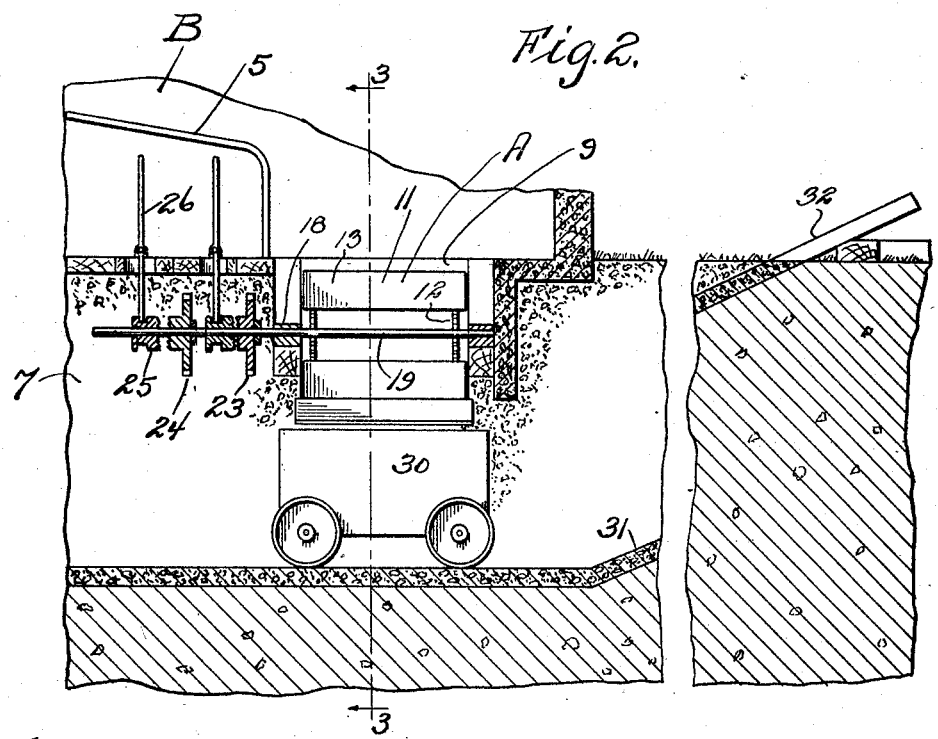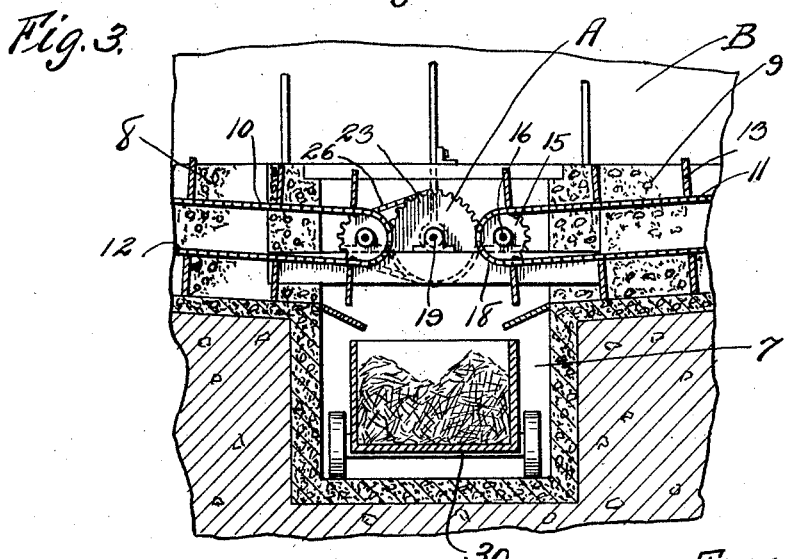

1,551,221

UNITED STATES PATENT OFFICE.

FRANK SHOLES, OF SPARTA, WISCONSIN.

UNDERGROUND POWER BARN-CLEANING DEVICE.

Application filed March 5, 1924. Serial No. 697,075.

*To all whom it may concern:*

Be it known that I, FRANK SHOLES, a citizen of the United States, residing at Sparta, in the county of Monroe and State of Wisconsin, have invented certain new and useful Improvements in Underground Power Barn-Cleaning Devices, of which the following is a specification.

This invention appertains to a novel cleaning appliance for barns and stables, and the primary object of the invention is the provision of gutters arranged longitudinally of a barn and adjacent to the stalls therein for receiving endless conveyors, whereby manure and the like can be expeditiously conveyed to a common point.

Another object of the invention is the provision of novel power means for synchronously operating the conveyors and novel means for receiving the manure from the conveyors.

A further object of the invention is the provision of a barn particularly adapted for dairy purposes embodying longitudinal rows of facing stalls, having a tunnel formed in the transverse center thereof for receiving a wheeled vehicle and pairs of conveyors arranged at the entrance of the stalls for receiving manure therefrom terminating over the said tunnel whereby the manure from the conveyors can be dumped into the said wheeled vehicle.

A further object of the invention is the provision of an elevated track leading from the tunnel whereby the wheeled vehicle can be expeditiously raised for permitting the contents thereof to be dumped into a wagon.

A further object of the invention is to provide a barn cleaning apparatus of the above character in which the barn can be in a cleanly and sanitary condition at all times with a minimum amount of effort and which will permit the manure to be expeditiously carried from the barn to a field for fertilizing purposes.

A still further object of the invention is to provide an improved device for cleaning barns which will be durable and efficient in use, one which will be simple and easy to manufacture, and one which can be incorporated with new or old barns at comparatively small cost.

With these and other objects in view, the invention consists in the novel construction, arrangement and formation of parts, as will be hereinafter more specifically described, claimed and illustrated in the accompanying drawings, in which drawings:

Figure 1 is a plan view of the improved barn cleaning apparatus, the barn being shown in horizontal section, Figure 2 is a fragmentary transverse section through the barn showing the improved cleaning apparatus incorporated therewith, and Figure 3 is a detail fragmentary longitudinal section taken through the barn on the line 3—3 of Figure 2, illustrating the endless conveyors terminating over the transverse tunnel.

Referring to the drawings in detail, wherein similar reference characters designate corresponding parts throughout the several views, the letter A generally indicates the improved barn cleaning apparatus and B a barn with which it is associated.

The barn B can be constructed in any desired way and as shown is provided with two rows of facing stalls 5 for receiving the cows or other animals with a feeding alley way 6 therebetween.

In accordance with the invention a transversely extending tunnel 7 is formed in the barn at the central portion thereof and the tunnel has communicating therewith longitudinally extending gutters 8 and 9. These gutters are arranged directly at the rear ends of the stalls 5 so that the droppings from the cattle or horses will fall therein.

Endless conveyors 10 and 11 are mounted within the gutters 8 and 9 and are arranged so as to carry the manure to the tunnel 7. Each of the conveyors include endless spaced sprocket chains 12 which are connected together by upstanding cleats or flights 13 which are adapted to engage the bottom of the troughs. The rear ends of the sprocket chains 12 of the conveyors are trained over sprocket wheels 14 which are keyed to the shafts 15 mounted in suitable bearings carried by the walls of the gutters. The inner ends of the conveyors extend over the tunnel 7 and the sprocket chains 12 thereof are trained over the sprocket wheels 15 keyed or otherwise secured to the shafts 16. The shafts 16 are rotatably mounted in suitable bearings 17 which can be mounted on beams 18 which extend crosswise of the tunnel.

A driveshaft 19 is arranged longitudinally within the tunnel and is journaled in suitable bearings carried by the said cross beams 18. The outer end of the drive shaft 19 extends into a suitable power house 20 which can be built alongside of the barn B. This power house 20 can contain any suitable type of prime mover such as an electric motor 21. The armature shaft of the motor 21 is connected with the drive shaft 19 by a suitable drive belt 22.

In order to drive the conveyors 10 and 11 in the same direction and toward the tunnel 7 the drive shaft 19 adjacent to the conveyors 10 and 11 is provided with a drive gear wheel 23 and a sprocket wheel 24. These wheels 23 and 24 are adapted to be operatively connected to the drive shaft 19 through the use of suitable clutches 25 which can be manipulated by a lever 26. The drive gear 23 meshes with a drive pinion 25 keyed to the shaft 16 or the conveyor 11, while the sprocket wheel 24 is operatively connected through a sprocket chain 26 with sprocket wheel 27 keyed to the shaft 16 of the conveyor 10.

It is obvious that when it its desired to operate any of the conveyors that it is merely necessary to manipulate the said lever 26.

A wheeled cart 30 is arranged to travel within the tunnel 7 and the cart can be placed under either pair of the conveyors 10 and 11 as desired for receiving the manure therefrom. The tunnel 7 opens out through one side of the barn B and in order that the cart can be readily wheeled to the level of the ground an inclined runway 31 is provided at the end of the tunnel which opens out through the side of the barn.

It is preferred to dump the cart 30 directly into a wagon and in order to elevate the said cart an inclined trestle 32 is provided which is in direct alignment with the inclined runway 31. This inclined trestle 32 can be provided with tracks 33 for receiving the cart if so desired. It is obvious that a wagon can be driven at the high end of the trestle and the cart wheeled up on the trestle and dumped directly therein.

From the foregoing description, it can be seen that I have provided a novel cleaning system for barns in which the manure can be conveyed in an expeditious manner directly from the barn into an awaiting wagon. The apparatus permits of the barn being cleaned in a minimum amount of time without necessitating the opening of the barn which allows the barn to be kept in a warm condition at all times. Further, the manure can be kept in the tunnel without danger of freezing when it is not desired to dump the manure out at once into the wagon.

Changes in details may be made without departing from the spirit or the scope of this invention.

What I claim as new is:

1. The combination with a barn having longitudinal rows of facing stalls, of a cleaning apparatus for the barn comprising a transverse tunnel arranged in the central portion of the barn, gutters disposed at the rear ends of the rows of stalls communicating with the tunnel, and conveyors arranged in the gutters and extending into the tunnel.

2. The combination with a barn having longitudinal rows of facing stalls therein, means for cleaning the barn comprising a transverse tunnel arranged in the central portion of the barn, gutters arranged at the rear ends of the rows of stalls and communicating with the tunnel, endless conveyors arranged in the gutters and extending into the tunnel, and a wheeled cart arranged in the tunnel adapted to extend under the endless conveyors.

3. The combination with a barn including longitudinally extending rows of facing stalls, means for cleaning the barn comprising a tunnel arranged in the transverse center of the barn, longitudinally extending gutters arranged at the rear ends of the stalls communicating with the tunnel, a drive shaft disposed within the tunnel, means for driving the shaft, means for operating all of the conveyors towards the tunnel from said shaft, a wheeled cart adapted to travel within the tunnel and to extend under the conveyors, the tunnel opening out through one side of the barn, and an inclined runway upon which the cart is adapted to travel.

In testimony whereof I affix my signature.

FRANK SHOLES.